(12) United States Patent
Yang et al.

(10) Patent No.: US 11,187,513 B2
(45) Date of Patent: Nov. 30, 2021

(54) ANGLE RULER

(71) Applicant: DONCERO (SHANGHAI) INDUSTRIAL CO., LTD., Shanghai (CN)

(72) Inventors: Zhongyi Yang, Shanghai (CN); Xiaodong Tian, Shanghai (CN); Zhe Wang, Shanghai (CN)

(73) Assignee: DONCERO (SHANGHAI) INDUSTRIAL CO., LTD., Shanghai (CN)

( * ) Notice: Subject to any disclaimer, the term of this patent is extended or adjusted under 35 U.S.C. 154(b) by 316 days.

(21) Appl. No.: 16/343,772

(22) PCT Filed: Feb. 23, 2017

(86) PCT No.: PCT/CN2017/074522
§ 371 (c)(1),
(2) Date: Apr. 21, 2019

(87) PCT Pub. No.: WO2018/086269
PCT Pub. Date: May 17, 2018

(65) Prior Publication Data
US 2019/0249972 A1 Aug. 15, 2019

(30) Foreign Application Priority Data
Nov. 8, 2016 (CN) .......................... 201621203282.6

(51) Int. Cl.
*G01B 3/04* (2006.01)
*G01C 9/28* (2006.01)
(Continued)

(52) U.S. Cl.
CPC ............... *G01B 3/04* (2013.01); *G01B 3/205* (2013.01); *G01B 5/24* (2013.01); *G01C 9/28* (2013.01)

(58) Field of Classification Search
CPC . G01B 3/04; G01B 3/20; G01B 3/205; G01B 3/56; G01B 3/566; G01B 5/24; G01B 7/02; G01B 7/30
(Continued)

(56) References Cited

U.S. PATENT DOCUMENTS 4,229,883 A * 10/1980 Kobashi .................. G01B 3/205
33/784
5,713,135 A * 2/1998 Acopulos .................. G01B 3/56
33/1 PT
(Continued)

FOREIGN PATENT DOCUMENTS

CN 2864585 Y 1/2007
CN 201016681 Y 2/2008
(Continued)

OTHER PUBLICATIONS

International Search Report for PCT/CN2017/074522 dated Jul. 27, 2017, ISA/CN.
(Continued)

*Primary Examiner* — Christopher W Fulton
(74) *Attorney, Agent, or Firm* — Yue (Robert) Xu; Apex Attorneys at Law, LLP

(57) ABSTRACT

An angle ruler includes a ruler, a ruler holder and a digital display module, the digital display module is fixed on the ruler holder and the ruler holder has an inclined edge. The angle ruler can not only retain the using habit of the user, but also can make the reading more convenient, accurate and time-saving.

9 Claims, 3 Drawing Sheets

(51) Int. Cl.
*G01B 5/24* (2006.01)
*G01B 3/20* (2006.01)

(58) Field of Classification Search
USPC .......................................... 33/480, 706–708
See application file for complete search history.

(56) References Cited

U.S. PATENT DOCUMENTS

| | | | | |
|---|---|---|---|---|
| 5,901,458 | A * | 5/1999 | Andermo | G01D 5/2086 |
| | | | | 33/810 |
| 6,785,976 | B1 * | 9/2004 | Morehouse | B43L 7/005 |
| | | | | 33/418 |
| 7,253,611 | B2 * | 8/2007 | Ma | G01B 3/205 |
| | | | | 324/207.2 |
| 8,015,719 | B2 * | 9/2011 | Juhl | B43L 7/02 |
| | | | | 33/427 |
| 2002/0088130 | A1 * | 7/2002 | Szumer | G01B 3/566 |
| | | | | 33/480 |
| 2002/0152626 | A1 * | 10/2002 | Sasaki | G01B 3/205 |
| | | | | 33/706 |
| 2003/0167648 | A1 * | 9/2003 | Winton, III | G01B 5/24 |
| | | | | 33/534 |
| 2007/0204475 | A1 * | 9/2007 | Marcus | G01B 3/566 |
| | | | | 33/480 |
| 2007/0220764 | A1 * | 9/2007 | Wolken | B43L 7/14 |
| | | | | 33/427 |
| 2007/0283587 | A1 * | 12/2007 | Cerwin | G01B 7/30 |
| | | | | 33/471 |
| 2016/0313110 | A1 * | 10/2016 | Santisteban | G01B 5/255 |

FOREIGN PATENT DOCUMENTS

| | | | |
|---|---|---|---|
| CN | 201311255 | Y | 9/2009 |
| CN | 201819655 | U | 5/2011 |
| CN | 103759604 | A | 4/2014 |
| CN | 104097429 | A | 10/2014 |
| CN | 204988059 | U | 1/2016 |
| CN | 205655756 | U | 10/2016 |
| CN | 205881241 | U | 1/2017 |
| CN | 212482444 | U * | 2/2021 |
| JP | H116730 | A | 1/1999 |

OTHER PUBLICATIONS

CNIPA First Office Action corresponding to Application No. 201621203282.6 dated Mar. 30, 2017.

* cited by examiner

ANGLE RULER

The application is the national phase of International Application No. English translation of PCT/CN2017/074522, titled "ANGLE RULER", filed on Feb. 23, 2017, which claims the priority to Chinese patent application No. 201621203282.6 titled "ANGLE RULER", filed with the Chinese Patent Office on Nov. 8, 2016, which applications are incorporated herein by reference in their entireties.

FIELD

The present application relates to rulers, and particularly relate to an angle ruler.

BACKGROUND

At present, rulers are widely used in measurement scale, and the use of the ruler still remains in the way of determining a length with reference to the scale on the ruler.

However, the defect of using the ruler to measure is that the accuracy of reading is not high, and it requires relying on a professional angle measuring tool to measure an angle.

SUMMARY

In view of the problems existing in the conventional technology, an object of the present application is to overcome the above disadvantages, providing an angle ruler, which can not only retain the using habit of the user, but also can make the reading more convenient, accurate and time-saving.

A technology solution of an angle ruler according to an embodiment of the present application includes:

a ruler, a ruler holder and a digital display module, where the digital display module is fixed on the ruler holder and the ruler holder has an inclined edge.

Preferably, according to the above technology solution of the angle ruler, the angle ruler further includes a first linear displacement sensor, where the first linear displacement sensor is provided on the ruler, and the ruler is horizontally movable relative to the ruler holder to generate a relative linear displacement; the digital display module is fixed to the ruler holder and is configured to display a value of the linear displacement.

Preferably, according to the above technology solution of the angle ruler, the digital display module is connected to the ruler holder by a screw.

Preferably, according to the above technology solution of the angle ruler, the angle ruler further includes a rotating shaft and a movable member rotating along the rotating shaft, where the rotating shaft is provided on the ruler holder, an angular displacement sensor and a second linear displacement sensor are provided on the movable member, and the ruler is rotatable relative to the ruler holder to generate a relative angular displacement; the digital display module is further configured to display the value of the angular displacement.

Preferably, according to the above technology solution of the angle ruler, the angle ruler further includes a gravity acceleration sensor, where the gravity acceleration sensor is provided in the digital display module.

Preferably, according to the above technology solution of the angle ruler, the ruler holder is further provided with a plurality of magnets.

Preferably, according to the above technology solution of the angle ruler, the ruler holder is further provided with a bubble level.

BRIEF DESCRIPTION OF THE DRAWINGS

For clearer illustration of the technical solutions according to embodiments of the present application or conventional techniques, hereinafter are briefly described the drawings to be applied in embodiments of the present application or conventional techniques. Apparently, the drawings in the following descriptions are only some embodiments of the present application, and other drawings may be obtained by those skilled in the art based on the provided drawings without creative efforts.

DETAILED DESCRIPTION

In view of the problems existing in the conventional technology, an object of the present application is to overcome the above disadvantages. An angle ruler is provided according to the present application, not only to retain a habit of the user, but also to make the reading more convenient, accurate and time-saving.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the protection scope of the present application.

Figure 1:
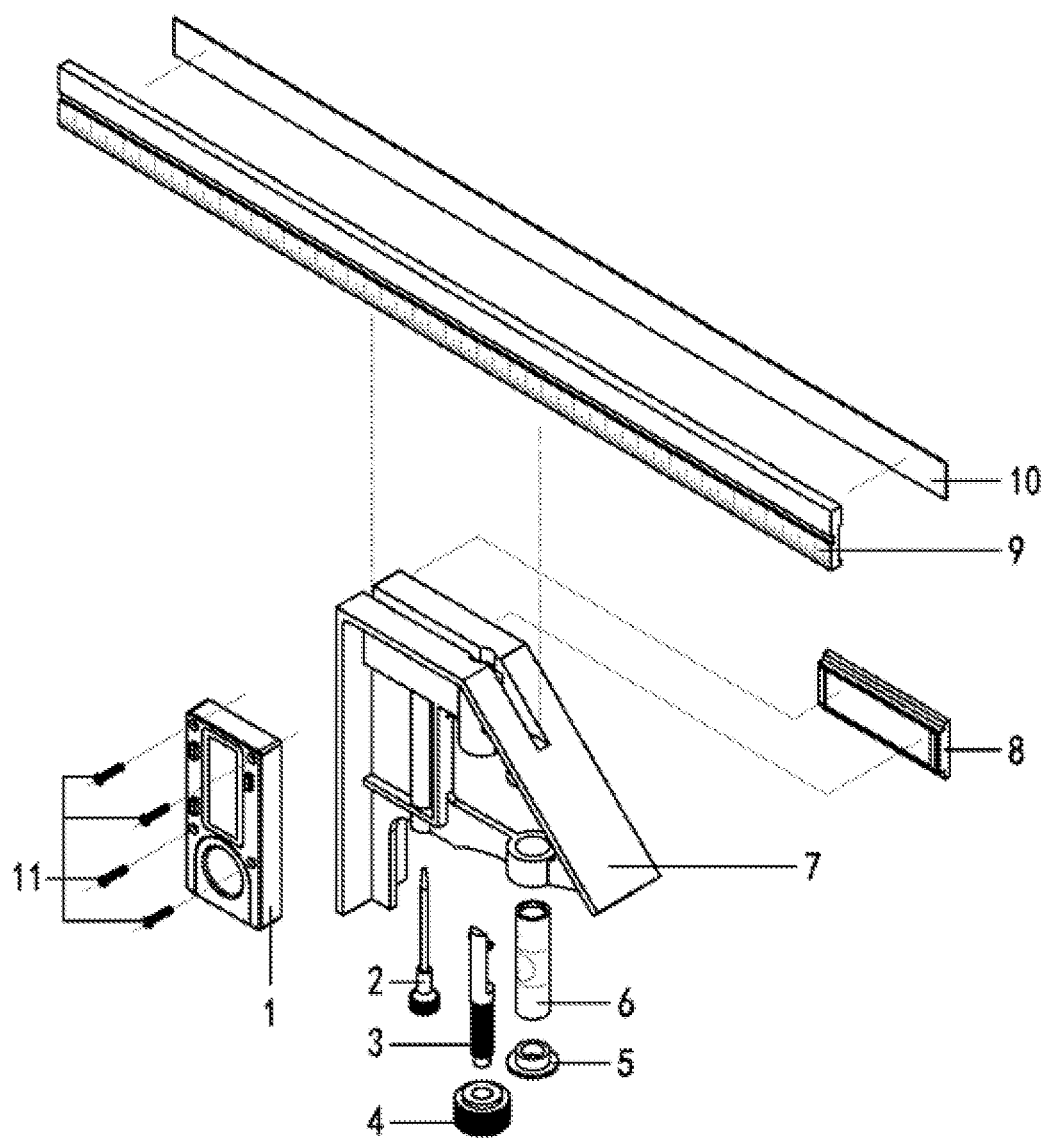
FIG. 1 is a schematic view showing the structure of an angle ruler according to an embodiment of the present application.

Referring to FIG. 1, the technology solution of the angle ruler according to an embodiment of the present application includes:

a ruler 9, a first linear displacement sensor 10, a ruler holder 7 and a digital display module 1, where the ruler holder has an inclined edge;

the ruler 9 is provided with the first linear displacement sensor 10, and the ruler 9 is horizontally movable relative to the ruler holder 7 to generate a relative linear displacement; and the digital display module 1 is fixed on the ruler holder 7, the digital display module 1 is integrated with the linear displacement sensor and configured to display the value of the linear displacement. The fixing manner of the digital display module 1 and the ruler holder 7 may be a detachable fixing manner, such as fixing the digital display module 1 to the ruler holder 7 by a screw 11, or a non-detachable fixing manner, such as welding.

Since the first linear displacement sensor 10 is mounted on the ruler 9, by pulling the ruler 9, the ruler 9 and the ruler holder 7 are relatively linearly displaced, and the value of the linear displacement is displayed on the digital display module 1. A bubble level 6 is provided on the ruler holder 7 to indicate the horizontal level of the present application.

According to the above technology solution of the angle ruler, the ruler holder 7 is further provided with a scriber 2, a lock screw 3, a lock nut 4, a bubble level 6, and a bubble level cap 5, and the bubble level 6 is configured to indicate the horizontal level of the angle ruler in the present application.

Figure 2:
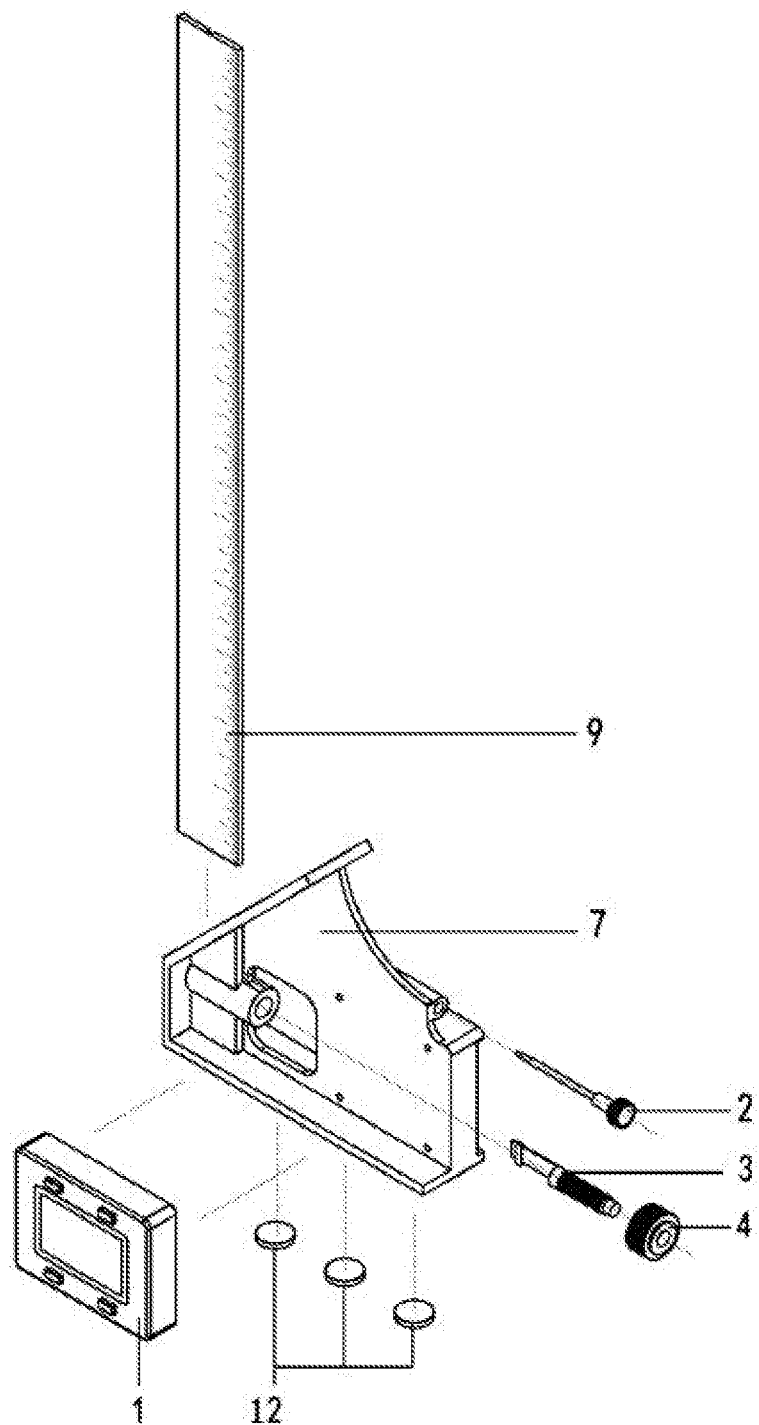
FIG. 2 is a schematic view showing the structure of an angle ruler according to another embodiment of the present application.

Referring to FIG. 2, the technology solution of the angle ruler according to another embodiment of the present application includes:

a ruler 9, a ruler holder 7 and a digital display module 1, where the ruler holder has an inclined edge, the digital display module 1 is fixed on the ruler holder 7, and the digital display module 1 is provided with a gravity acceleration sensor. The fixing manner of the digital display module 1 and the ruler holder 7 may be a detachable fixing manner, such as fixing the digital display module 1 to the ruler holder 7 by a screw 11, or a non-detachable fixing manner, such as welding.

A plurality of magnets 12 are provided on the ruler holder 7, and the plurality of magnets 12 are fixed to the ruler holder 7 and are attracted to an attractable workpiece by an attraction force of the plurality of magnets 12.

The ruler holder 7 is further provided with a scriber 2, a lock screw 3, and a lock nut 4.

In this embodiment, by pulling the ruler 9, the ruler 9 and the ruler holder 7 are relatively linearly displaced, the value of the linear displacement is indicated by a scale engraved on the ruler 9, the gravity acceleration sensor is integrated in the digital display module 1 and fixed on the ruler holder 7, the plurality of magnets 12 are also fixed on the ruler holder 7 and are attracted to the attractable workpiece by the attraction of the plurality of magnets 12, and the value of the inclined angle is displayed on the digital display module 1.

Figure 3:
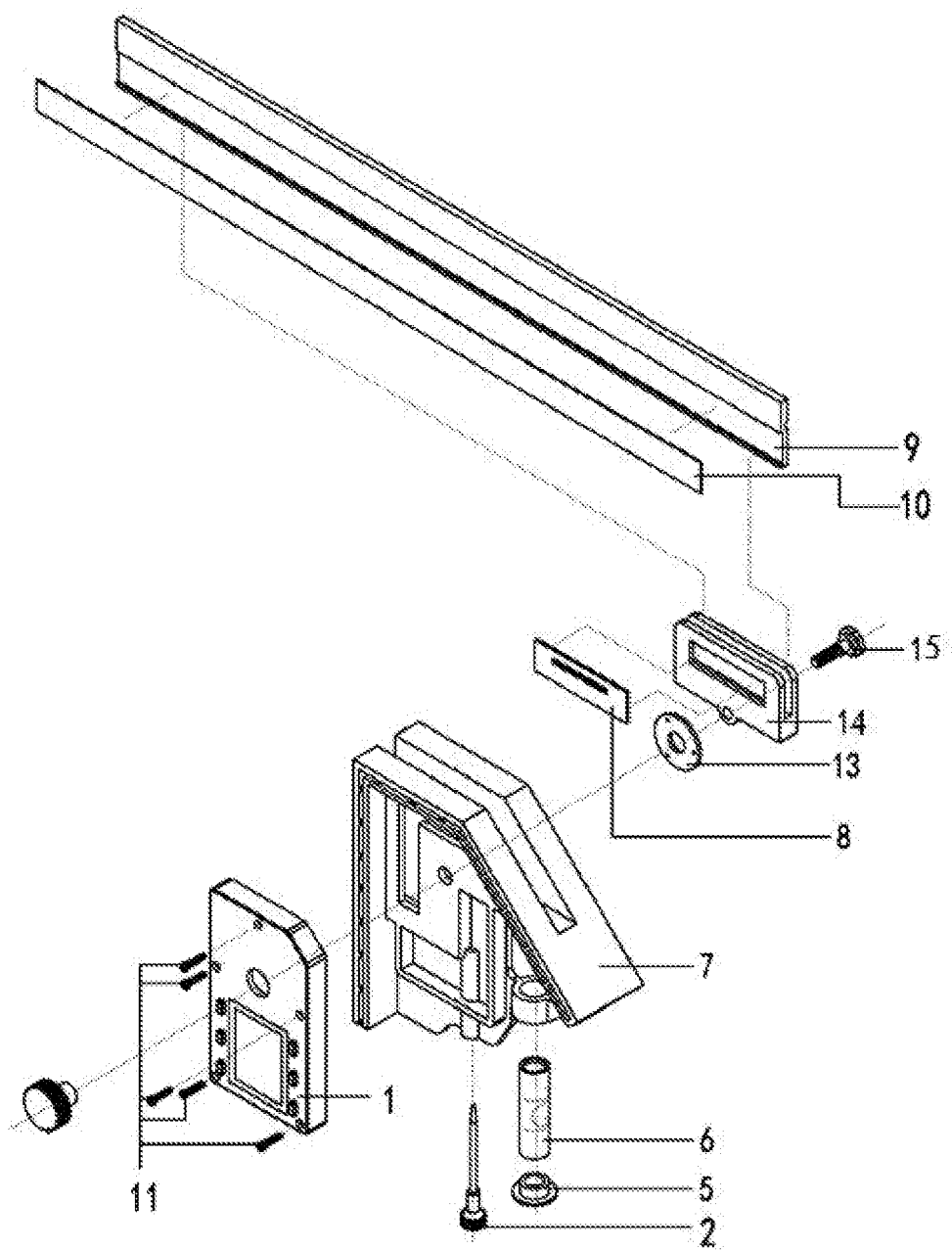
FIG. 3 is a schematic view showing the structure of an angle ruler according to another embodiment of the present application.

Referring to FIG. 3, the technology solution of the angle ruler according to another embodiment of the present application includes:

a ruler 9, a first linear displacement sensor 10, a ruler holder 7 and a digital display module 1, where the ruler holder is embodied with an inclined edge;

the ruler 9 is provided with the first linear displacement sensor 10, and the ruler 9 is horizontally movable relative to the ruler holder 7 to generate a relative linear displacement; and the digital display module 1 is fixed on the ruler holder 7 and configured to display the values of the linear displacement. The fixing manner of the digital display module 1 and the ruler holder 7 may be a detachable fixing manner, such as fixing the digital display module 1 to the ruler holder 7 by a screw 11, or a non-detachable fixing manner, such as welding.

According to the above technology solution of the angle ruler, the ruler holder 7 is further provided with a scriber 2, a bubble level 6, and a bubble level cap 5, and the bubble level 6 is configured to indicate the horizontal level of the angle ruler in the present application.

The ruler holder 7 is further provided with a rotating shaft 15 and a movable member 14 rotating about the rotating shaft 15. An angular displacement sensor 13 and a second linear displacement sensor 8 are arranged on the movable member 14, and the ruler 9 is rotatable relative to the ruler holder 7 to generate a relative angular displacement. The digital display module 1 is further configured to display the value of the angular displacement.

The above embodiments are only used to illustrate the technical solutions of the present application, which are not limited thereto; although the present application has been described in detail with reference to the above embodiments, the person skilled in the art should be understand that: the technical solutions described in the above embodiments can still be modified, or some of the technical features can be equivalently replaced; the modifications and replacements of the present application do not depart from the spirit and scope of the technical solutions of the embodiments of the present application.

The invention claimed is:

1. An angle ruler, comprising: a ruler, a ruler holder and a digital display module, wherein the digital display module is fixed on the ruler holder and the ruler holder has an inclined edge;

wherein the angle ruler further comprises a first linear displacement sensor, wherein the first linear displacement sensor is arranged on the ruler, and the ruler is horizontally movable relative to the ruler holder to generate a relative linear displacement; the digital display module is fixed to the ruler holder and is configured to display a value of the linear displacement; and a rotating shaft and a movable member rotating about the rotating shaft, wherein the rotating shaft is arranged on the ruler holder, an angular displacement sensor and a second linear displacement sensor are arranged on the movable member, and the ruler is rotatable relative to the ruler holder to generate a relative angular displacement; the digital display module is further configured to display the value of the angular displacement.

2. The angle ruler according to claim 1, wherein the digital display module is connected to the ruler holder by a screw.

3. The angle ruler according to claim 2, wherein the ruler holder is further provided with a bubble level.

4. The angle ruler according to claim 1, further comprising a gravity acceleration sensor, wherein the gravity acceleration sensor is provided in the digital display module.

5. The angle ruler according to claim 4, wherein the ruler holder is further provided with a plurality of magnets.

6. The angle ruler according to claim 5, wherein the ruler holder is further provided with a bubble level.

7. The angle ruler according to claim 4, wherein the ruler holder is further provided with a bubble level.

8. The angle ruler according to claim 1, wherein the ruler holder is further provided with a bubble level.

9. The angle ruler according to claim 1, wherein the ruler holder is further provided with a bubble level.

* * * * *